US010677927B2

(12) United States Patent
Davies

(10) Patent No.: US 10,677,927 B2
(45) Date of Patent: Jun. 9, 2020

(54) INTERFERENCE MITIGATION FOR A RECEIVER

(71) Applicant: QINETIQ LIMITED, Farnborough, Hampshire (GB)

(72) Inventor: Nigel Clement Davies, Malvern (GB)

(73) Assignee: QINETIQ LIMITED, Hampshire (GB)

(*) Notice: Subject to any disclaimer, the term of this patent is extended or adjusted under 35 U.S.C. 154(b) by 390 days.

(21) Appl. No.: 15/324,627

(22) PCT Filed: Jul. 2, 2015

(86) PCT No.: PCT/EP2015/065125
§ 371 (c)(1),
(2) Date: Jan. 6, 2017

(87) PCT Pub. No.: WO2016/005270
PCT Pub. Date: Jan. 14, 2016

(65) Prior Publication Data
US 2017/0205510 A1  Jul. 20, 2017

(30) Foreign Application Priority Data
Jul. 9, 2014 (GB) .................................. 1412194.1

(51) Int. Cl.
G01S 19/21 (2010.01)
G01S 19/32 (2010.01)
(Continued)

(52) U.S. Cl.
CPC .............. G01S 19/21 (2013.01); G01S 19/32 (2013.01); H04K 3/255 (2013.01); G01S 19/14 (2013.01);
(Continued)

(58) Field of Classification Search
CPC ........ G01S 19/21; G01S 19/32; G01S 19/215; G01S 19/14; H04K 3/25; H04K 3/255; H04K 1/10
(Continued)

(56) References Cited

U.S. PATENT DOCUMENTS 5,678,169 A    10/1997  Turney
7,319,713 B2 *  1/2008  Viero ................. H04B 1/70755
                                                    375/130
(Continued)

FOREIGN PATENT DOCUMENTS

EP    2012488 A1    1/2009
GB    2 398 709 A   8/2004
(Continued)

OTHER PUBLICATIONS

Oct. 11, 2018 Search Report issued in Russian Patent Application No. 2017104079/07.
(Continued)

Primary Examiner — Chuong P Nguyen
(74) Attorney, Agent, or Firm — Oliff PLC

(57) ABSTRACT

A method for mitigating interference in a receiver, where the received signal is transmitted in a fashion having equivalent information content in at least two distinct bands. The method compares mean power per unit bandwidth in suitably normalised sidebands and sets a rejection threshold based upon the measured levels. Bands above the threshold may be rejected from further processing. The bands may include sidebands produced by a modulation process that produces sidebands having the same informational content. The threshold may be set relative to the band having the lowest mean power per unit bandwidth or according to some other function of the bands. Also extends to a signal processor in a receiver, and a receiver. The primary focus of the
(Continued)

application is toward the Galileo Public Regulated Service (PRS) Satellite navigation signal.

14 Claims, 4 Drawing Sheets

(51) Int. Cl.
*H04K 3/00* (2006.01)
*H04K 1/10* (2006.01)
*G01S 19/14* (2010.01)

(52) U.S. Cl.
CPC .............. *G01S 19/215* (2013.01); *H04K 1/10* (2013.01); *H04K 3/228* (2013.01)

(58) Field of Classification Search
USPC ...................... 342/357.59, 357.52, 357.72
See application file for complete search history.

(56) References Cited

U.S. PATENT DOCUMENTS

| | | | | |
|---|---|---|---|---|
| 7,403,752 | B2* | 7/2008 | Raghavan | H04L 27/2601 375/265 |
| 7,580,444 | B2* | 8/2009 | Brown | H04B 1/7143 375/132 |
| 7,660,374 | B2* | 2/2010 | Casabona | G01S 19/21 375/144 |
| 8,144,054 | B2* | 3/2012 | Geswender | G01S 19/21 342/357.59 |
| 8,396,434 | B2* | 3/2013 | Kamata | G01R 23/165 455/126 |
| 8,681,904 | B2* | 3/2014 | Okamoto | H03G 3/3078 333/149 |
| 8,824,361 | B2* | 9/2014 | Rugamer | G01S 19/13 370/317 |
| 8,861,661 | B2* | 10/2014 | Fujimura | H04B 7/15542 375/349 |
| 8,923,771 | B2* | 12/2014 | Zeng | H04L 27/0006 455/62 |
| 9,194,902 | B2* | 11/2015 | Murrin | G01R 29/02 |
| 9,350,580 | B2* | 5/2016 | Sidiropoulos | H03G 3/3078 |
| 10,090,870 | B1* | 10/2018 | Dai | H04B 1/1036 |
| 2003/0112896 | A1* | 6/2003 | Raghavan | H04L 27/2601 455/75 |
| 2005/0259760 | A1 | 11/2005 | Casabona et al. | |
| 2008/0181323 | A1* | 7/2008 | Waters | H04L 1/206 375/260 |
| 2012/0038512 | A1 | 2/2012 | Geswender et al. | |
| 2014/0064115 | A1 | 3/2014 | Chang et al. | |

FOREIGN PATENT DOCUMENTS

| | | |
|---|---|---|
| JP | H06141019 A | 5/1994 |
| JP | H07007463 A | 1/1995 |
| JP | 2010226512 A | 10/2010 |
| JP | 2011521258 A | 7/2011 |
| RU | 2158933 C1 | 11/2000 |
| WO | 2009142729 A1 | 11/2009 |

OTHER PUBLICATIONS

Decision on Grant issued in Russian Patent Application No. 2017104079/07.

Schubert et al., "BaSE: Development of a Galileo PRS Receiver," 6th European Workshop on GNSS Signals and Processing, Dec. 6, 2013 [http://www.iis.fraunhofer.de/content/dam/iis/de/doc/lv/los/lokalisierung/01_104_paper_WendelGNSSSignals2013.pdf].

Kumpumäki et al., "Narrow-Band Interference Rejection Using Transform Domain Signal Processing in a Hybrid DS/FH Spread-Spectrum System," IEEE, 1997.

Dec. 23, 2014 Search Report issued in British Patent Application No. 1412194.1.

Oct. 2, 2015 International Search Report issued in International Patent Application No. PCT/EP2015/065125.

Oct. 2, 2015 Written Opinion of the International Searching Authority issued in International Patent Application No. PCT/EP2015/065125.

* cited by examiner

INTERFERENCE MITIGATION FOR A RECEIVER

This invention relates to receivers such as radio receivers, and in particular, methods for processing signals received by a receiver to mitigate against interference that can occur, and for systems adapted or arranged to carry out such processing.

Certain radio signals are transmitted in a form that means the information content of the signal is present in two or more different spectral regions.

For example, signals may be broadcast using a modulation scheme that puts the information content into two or more sidebands around a central carrier frequency. One such example is the signal used for the Galileo Public Regulated Service (PRS) Satellite navigation signal. This is a Binary Offset Carrier (BOC) signal that is designed to put most of its transmission energy into two sidebands, symmetrically about a centre frequency. Each sideband contains, at the point of transmission, the same information content.

In many applications, the signals transmitted are received at a receiver at very low levels. Satellite navigation signals in particular are an extreme example of this, wherein the signal as received at the front end of the receiver can be orders of magnitude lower in power than the thermal noise, when viewed across a similar bandwidth. This makes the correct reception of the signals very susceptible to interference, both deliberately caused and inadvertent.

Prior art techniques exist for overcoming interference problems. For example, there are techniques that use nulls in a receiver's antenna system, positioning the null in the expected direction of the incoming interference signal, thus reducing the received power of the unwanted signal. Such multiple channel techniques are often expensive and complex to implement, as they need some means for tracking the position of the interferer, and for then steering or otherwise positioning the antenna null in the required direction.

Receivers may also implement interference rejection techniques that operate on a single channel signal. These include the use of filters such as notch filters to remove narrowband tonal interference. This technique can be broadened out to implement FFT based excisers capable of removing more complex or wider bandwidth interference signals.

It is an object of the present invention to provide an alternative technique for interference mitigation for certain types of signals.

According to a first aspect of the present invention there is provided a method of processing signals in a receiver, wherein the signal has been transmitted having equivalent information content present in at least two distinct spectral bands, the method comprising the steps of:

a) measuring the power in each of at least two of the spectral bands;

b) normalising the power measurements of each of the at least two spectral bands, the normalisation taking into account at least one of i) gain differences in the receiver signal chain, ii) differences caused by frequency propagation effects upon the at least two spectral bands, but not taking into account differences caused by interference signals;

c) generating a threshold based upon a function of the mean power per unit bandwidth in each spectral band d) choosing at least one of the spectral bands whose mean power per unit bandwidth is/are below the threshold value;

e) processing the chosen spectral bands to recover the information content therein.

Embodiments of the invention may be arranged to use a function in part (c) that selects the spectral band having the lowest normalised mean power per unit bandwidth, and which uses the power measured therein to set the threshold. By setting a threshold based upon the spectral band having the lowest normalised mean power per unit bandwidth, the method is able to reject any spectral band that lies above the threshold. Thus, any bands that have a significant interferer present may be discounted from further processing.

Some embodiments may employ other functions, such as, but not limited to, a mean, or other averaging function, of two or more spectral bands.

The method has particular applicability to GNSS signals, due to their very low signal levels at the receiver.

At least some of the steps of the method may advantageously be carried out in a signal processor. The signal processor may be a digital signal processor, and may be implemented in any convenient manner. It may comprise one or more of a specialised signal processor chip, a general purpose processor, a Field Programmable Gate Array, an Application Specific Integrated Circuit, or by any other suitable device. Alternatively, one or some of the steps may be carried out in separate devices.

Advantageously, the method may include the step of incorporating one or more filters, such as notch filters, which may be used to remove known interference signals prior to the normalisation step.

The threshold level may be set to be, for example, 3 dB, 4 dB, 6 dB, 10 dB or 13 dB above the normalised mean power per unit bandwidth of the spectral band having the lowest mean power per unit bandwidth. The level may be a fixed level, or may be variable. For example, the level may be based upon a mean of the normalised mean power per unit bandwidth values received over a time interval. This is advantageous in overcoming interferers that are present for a duration short compared to the measured time interval.

Some embodiments may set the threshold differently, such as a fixed amount (such as the amounts mentioned in the above paragraph) greater than the mean value of the normalised power per unit bandwidths measured across the spectral bands.

The threshold may also be set under conditions where there are known to be no interfering signals present. The threshold may also be set based upon expected, or theoretically predicted, conditions, e.g. using a model of the noise expected to be detected in the frequency bands of interest in a benign (i.e. jammer free) environment.

It should be noted that the term "equivalent information" being present in each spectral band means that each band contains substantially the same, or a very similar message, albeit that it may be modulated in a different manner, or with different parameters etc. Some embodiments may require, or be arranged to receive, signals in which at least two of the spectral bands are generated by a particular modulation process. For example, a particular modulation process may take an information stream and modulate it in a manner that creates multiple bands, each containing identical information. Thus, in these embodiments, the spectral bands generated in this manner will, at the time of creation, contain identical informational content, separated in frequency. Such modulation processes include, but are not limited to, amplitude modulation, BOC modulation, or any other modulation that produces identical sidebands around a centre frequency. It will be appreciated that the receiver upon which the method is implemented may be designed to received signals modulated in a specific, known manner, and hence may further comprise a demodulator for demodulating such signals.

If any one or more of the spectral bands differs in bandwidth from any other of the spectral bands, then it is advantageous to perform a bandwidth normalisation, so that power measurements can be compared directly. In such circumstances power measurements across each band may be divided by their respective bandwidth, so as to produce a power per unit bandwidth figure (equivalent to a mean power spectral density (PSD) measurement).

Some embodiments of the invention may be employed to process signals that are derived exclusively from a single modulation process that produces multiple spectral bands having (at source) identical information content, and which are each of the same bandwidth. Under such circumstances, power measurements taken across each band will not require the bandwidth normalisation discussed in the above paragraph.

The threshold level may be set according to the particular application for which the receiver is being used. It will be realised that if a very low threshold is set, then this will result in spectral bands having very slight (positive) differences in normalised mean power per unit bandwidth being discounted from the subsequent demodulation process. This could have a net negative effect on the performance of the receiver, as the loss of the information content in the rejected spectral band may be more severe than the gain derived from not processing the slightly noisy band.

Likewise, if the threshold is set too high, then a potentially very noisy spectral band may be subsequently processed, which would negatively impact receiver performance.

There is thus a trade-off in selecting the threshold value, that may vary between applications. The threshold level for a given application may be chosen based upon e.g. trial and error, computer modelling techniques, or by arbitrary choice. The threshold may also be adaptive, such that it changes over time according to e.g. interference levels detected at different times.

The spectral bands may be substantially adjacent, or nearly adjacent. For example, many transmission modulation schemes (e.g. BOC) generate spectral bands in pairs about a centre frequency. The spectral bands may therefore constitute these pairs. The spectral bands may also comprise of other, simultaneous transmissions of the same information content. For example, a signal may be simultaneously broadcast at two or more different frequencies, as is done with some GNSS signals. In these circumstances at least some of the spectral bands may be more widely separated from each other.

A practical example of this is the Galileo PRS code. This is transmitted on the E1 and E6 bands, which are separated by over 200 MHz. The particular BOC modulation used means that each of these bands has two main sidebands, giving four main spectral bands each containing the same navigational information content (albeit modulated with different spreading codes between the E1 and E6 bands). It will be appreciated that each sideband from a given E1 or E6 band inherently contain the same informational content at the time of creation of the modulated signal. Embodiments of the invention may therefore choose any of one to four of these spectral bands for further processing, dependent upon the relative normalised mean power per unit bandwidth levels of the signals within the bands.

According to a second aspect of the present invention there is provided a signal processor for use in a receiver, the receiver being for use in receiving signals transmitted having equivalent information content present in at least two distinct spectral bands, the signal processor comprising:

a) means for measuring the power in each of the at least two spectral bands
b) a normaliser for normalising the power in at least two of the spectral bands, the normalisation taking into account at least one of i) gain differences in the receiver signal chain, and ii) differences caused by frequency propagation effects upon the at least two spectral bands, but not taking into account differences caused by interference signals;
c) processing means for generating a threshold value based upon a function of the normalised mean power per unit bandwidth in each spectral band;
d) means for choosing other spectral bands whose normalised mean power per unit bandwidth values are below the threshold value;
e) means for providing the chosen spectral bands to subsequent processing means.

In some embodiments the signal processor may be arranged to select at least two of the bands to be processed from a signal generated by a modulation process that inherently produces at least two bands having the same information content.

In some embodiments the signal processor may additionally comprise a filter adapted to filter known interference signals before the power is measured at step a). This therefore aids the efficacy of subsequent filtering operations.

In some embodiments the processing means for generating the threshold may be arranged to set said threshold at a level greater than the mean power per unit bandwidth of the spectral band having the lowest mean power per unit bandwidth. Thus, it may therefore use the spectral band having the lowest normalised power per unit bandwidth to provide a reference power, and then select further bands based upon their difference between their measured power and the reference band. Bands greater than some margin above the reference band may be rejected for subsequent processing.

According to a third aspect of the present invention there is provided a radio receiver incorporating a processing system of the second aspect.

Any feature in one aspect of the invention may be applied to other aspects of the invention, in any appropriate combination. In particular, method aspects may be applied to apparatus aspects, and vice versa.

The invention will now be described in more detail, by way of example only, with reference to the following Figures, of which:

Figure 1:
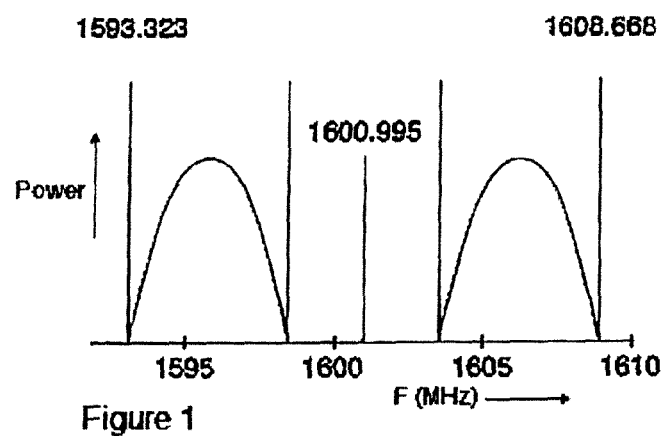
FIG. 1 shows a simplified representation of a transmitted signal spectrum of the type applicable to embodiments of the present invention, with no noise present.

FIG. 1 shows a graph of the power spectral density of the two main sidelobes of a transmitted radio signal. Smaller sidelobes have not been shown, for simplicity, but would generally be present in real-world signals. No interference signal is present in the spectrum. The spectrum is part of a BOC(5, 2.5) signal spectrum. A centre frequency of 1600.995 lies between the two sidelobes, with very little power present at the centre frequency itself. Each of the sidelobes contains the transmitted information content, and so the content can be recovered from any one of the sidelobes if a sufficiently strong signal is received.

A first embodiment of the invention comprises a radio receiver, adapted to receive a transmitted signal, such as the one shown in FIG. 1. The receiver is arranged to receive and downconvert the signal, to provide a measure of the power across the appropriate GNSS signal bandwidth. This bandwidth is known to the receiver, as it has prior knowledge of characteristics of the signal it is attempting to process. Following the downconversion, it divides the downconverted signal into a set of spectral bands, broadly matching the null-to null bandwidths of the major sidelobes expected to be present in the signal.

In practical GNSS applications the wanted signal received at a receiver lies well below the received noise level.

Figure 2:
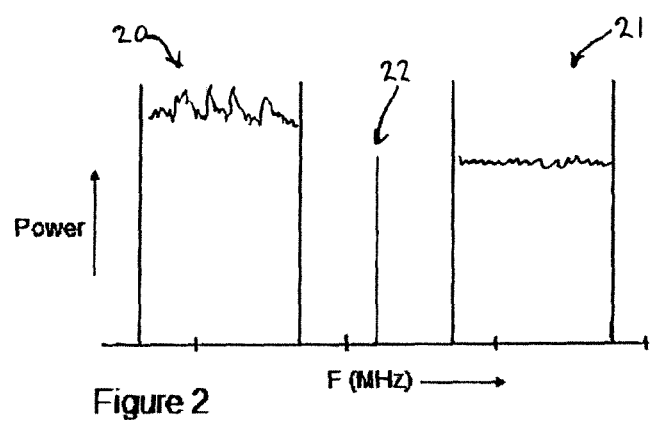
FIG. 2 shows a representation of a signal received at a receiver, having passed through analogue and initial digital elements of the receiver chain, and prior to selection of the sidebands as described herein.

FIG. 2 shows the power density spectrum of a signal that has been received in a GNSS receiver, and having passed through initial stages of the receiver signal chain. A lower sideband (20) and an upper sideband (21) are shown, these being symmetric about a centre frequency (22) It can be seen that the power density spectrum of the lower sideband (20) is at a higher level than that of the upper sideband, and also has more variance. The variance in the signal on the lower sideband (20) is likely due to interference signals being present on that sideband, while the generally increased level of the sideband may be due to interference, relative propagation effects, or differences in the receiver chain between the different sidebands. The latter two effects are removed (or at least ameliorated) in some embodiments of the invention by a normalisation process as described below.

The spectral band power measurement, subsequent normalisation, and correction for any differences in bandwidth of the spectral bands is carried out by first selecting the chosen spectral band using a bandpass filter. The following steps are then carried out:
 a) Measure the power at the output of the bandpass filter;
 b) Multiply the measured power by one or more scalar correction factors to normalise for known gain variations in the receiver, and/or for known variations in the propagation medium;
 c) Divide the result from b) by the bandwidth of the chosen spectral band to produce the mean power per unit bandwidth over the spectral band. (It will be appreciated that this step c) is not required in cases where all bands being processed are of the same bandwidth, as the measured powers will be already effectively normalised as regards to bandwidth).

The correction factors may be derived by various methods. The gain variations may be derived from a calibration procedure, e.g. prior to use or during a factory set-up (or both), and may take into account such things as an uneven amplifier or antenna gain profile across the spectral bands. The variations in the propagation medium may be known, due to e.g. theoretical propagation characteristics, or from measurements of known signals taken with a reference receiver, and then provided to the receiver implementing an embodiment of the invention.

The result of the normalisation process will be values representing the normalised mean power per unit bandwidth for each of the spectral bands. These values will have largely removed the differences due to receive gain variations and propagation effects, leaving just the differences caused by interference signals.

Figure 3:
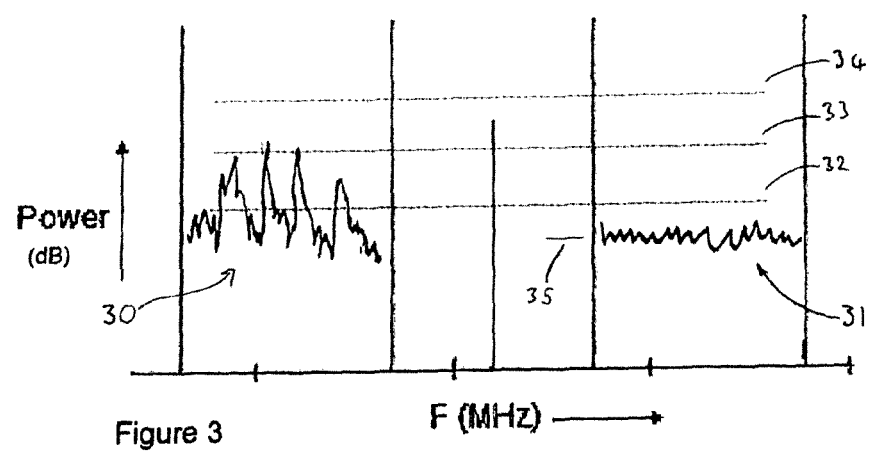
FIG. 3 shows both a received spectrum, and a normalised equivalent, the spectrum also containing narrowband noise at a relatively high level.

FIG. 3 shows the spectra of FIG. 2 after having passed through the normalisation process, these being the lower sideband (30) and upper sideband (31) respectively. The vertical scale has also been increased, to show the detail more clearly. In an embodiment of the invention, the spectral band having the lowest normalised mean power per unit bandwidth is chosen, this being the upper spectral band (31) in this case.

A threshold power value is then applied, based upon and relative to the chosen spectral band. For explanatory purposes, various thresholds are shown in FIG. 3. A first threshold (32) is 3 dB above the normalised mean power per unit bandwidth, while second (33) and third (34) thresholds are 6 dB and 10 dB above the normalised mean power per unit bandwidth (35).

It can be seen that the lower two thresholds (32, 33) are exceeded in the normalised spectrum on the left, but the highest threshold is above all of the spectrum's peaks. Therefore, if a threshold value of 3 dB or 6 dB were to be set, then only the right hand spectrum would be chosen for further processing. However, if a 10 dB threshold were set then both spectra would be used.

Only two spectral bands are shown in the example described above, but of course different systems could have more than two relevant spectral bands.

The subsequent processing of the chosen spectral band(s) is done in the normal way, appropriate to the type of signal being received. For example, in a GNSS application, the bands may be processed to retrieve timing or navigational information as required.

Figure 4:
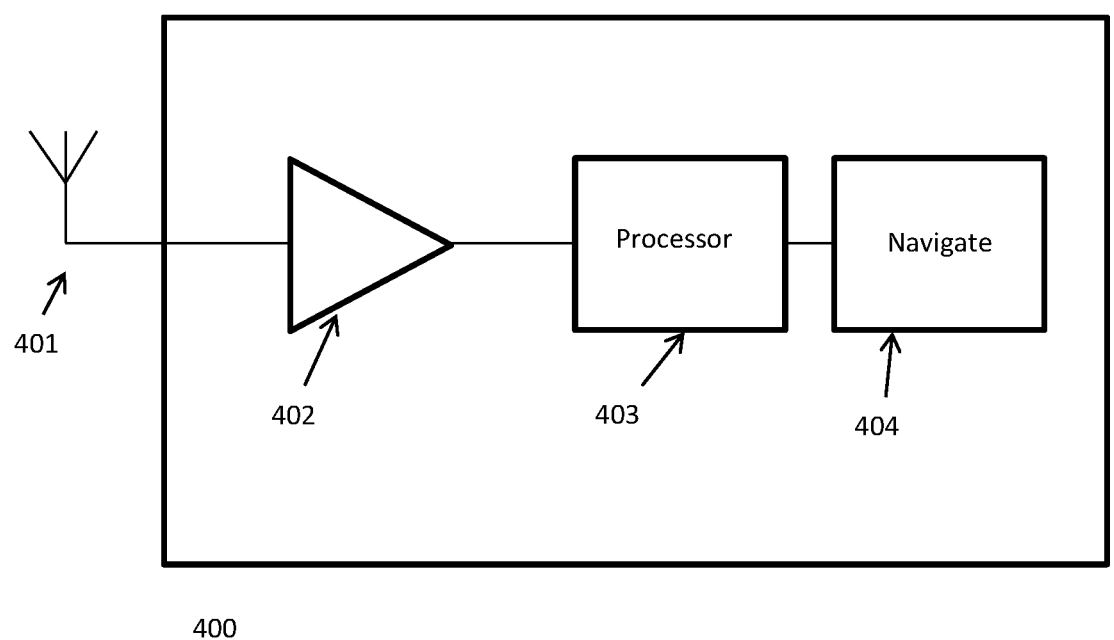
FIG. 4 shows in at a top level a receiver system on which the invention may be implemented.

FIG. 4 shows a radio receiver (400), comprising an antenna (401), an amplifier (402) and a processor (403) for implementing the method of the invention, with timing and navigational information (404) being produced by the receiver.

Figure 5:
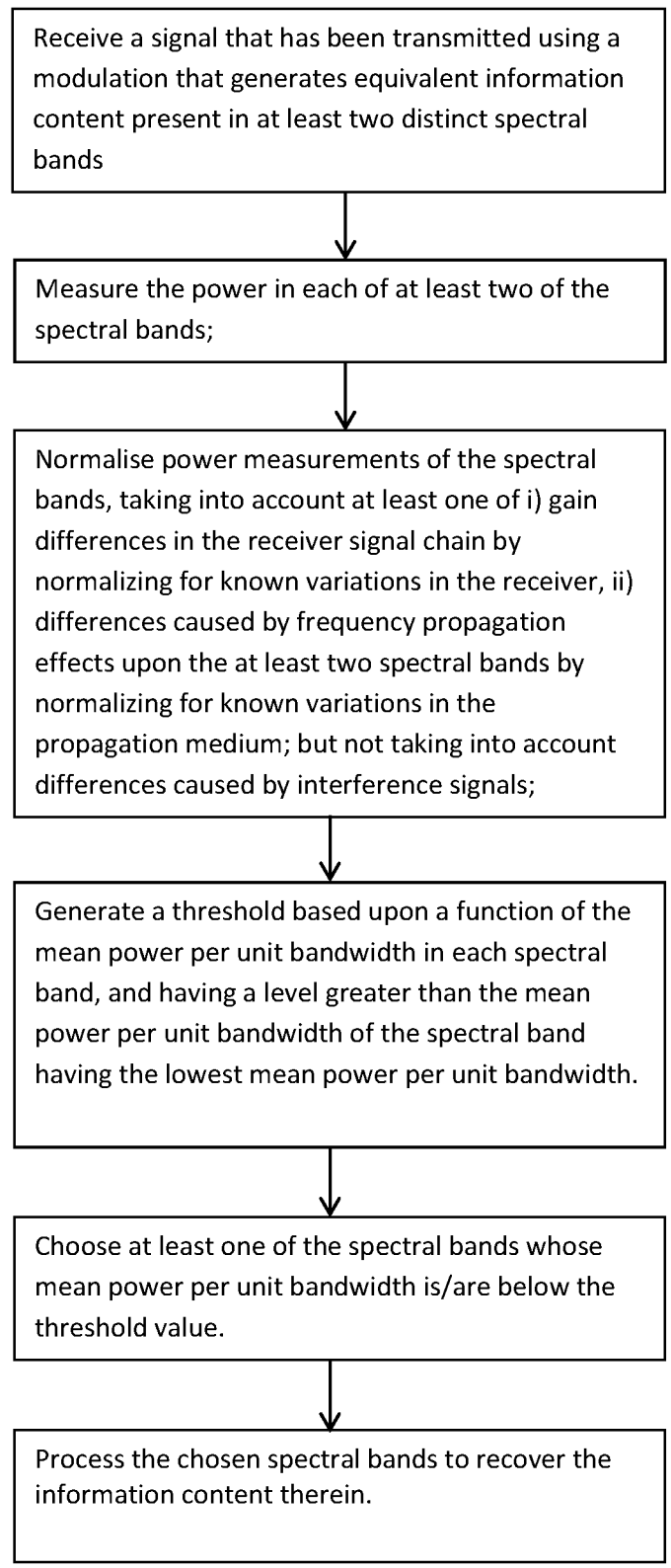
FIG. 5 illustrates the method according to an embodiment of the invention.

FIG. 5 shows the steps involved in implementing a process according to an embodiment of the present invention.

The examples shown above relate to radio systems, and particularly navigational receivers. However, the invention has application in other fields where identical or equivalent information is encoded into different spectral bands, and hence the invention should not be limited to application in radio systems. The normally skilled person may find application in e.g. sonar or optical communications systems also.

The invention claimed is:

1. A method of processing signals in a receiver comprising at least an antenna, an amplifier and a processor, wherein the signal has been transmitted using a modulation that generates equivalent information content present in at least two distinct spectral bands, the method comprising the steps of:
  a) measuring power in each of at least two of the spectral bands;
  b) normalizing the measured power of each of the at least two spectral bands, the normalization taking into account at least one of:
    i) gain differences in a receiver signal chain by multiplying the measured power by a scalar correction factor to normalize for known gain variations in the receiver, the scalar correction factor being derived from a calibration procedure, and taking into account amplifier and/or antenna gain profiles; and
    ii) differences caused by frequency propagation effects upon the at least two spectral bands by multiplying the measured power by a scalar correction factor to normalize for theoretical propagation characteristics, or known variations in a propagation medium;

but not taking into account differences caused by interference signals;

c) generating a threshold based upon a function of a mean power per unit bandwidth in each spectral band, the threshold having a level greater than the mean power per unit bandwidth of the spectral band having the lowest mean power per unit bandwidth;

d) choosing at least one of the spectral bands whose mean power per unit bandwidth is/are below the threshold value;

e) processing the chosen spectral bands to recover the information content therein.

2. The method as claimed in claim 1, wherein the threshold value is determined by measuring amplitudes of the spectral bands in conditions where there are known to be no interfering signals present.

3. The method as claimed in claim 1, wherein the threshold is adjusted based upon a time sequence of previous power measurements.

4. The method as claimed in claim 1, wherein the threshold is set at a level of approximately 3 dB, 4 dB, 6 dB, 10 dB or 13 dB above the spectral band having the lowest mean power per unit bandwidth.

5. The method as claimed in claim 1, wherein the method comprises an additional step, carried out before step a), of filtering the signal in the receiver to remove known interference signals.

6. The method as claimed in claim 5, wherein the filtering is performed using one or more notch filters.

7. The method as claimed in claim 1, wherein there are two spectral bands, each comprising sidebands around a center frequency.

8. The method as claimed in claim 1, wherein the signal is a global navigation satellite system signal.

9. The method as claimed in claim 8, wherein, in step (e), the processor produces timing and/or navigational information.

10. A signal processor for use in a receiver, the receiver being for use in receiving signals transmitted having equivalent information content present in at least two distinct spectral bands, the signal processor comprising:

a) a measuring system for measuring power in each of the at least two spectral bands;

b) a normalizer for normalizing the measured power in the at least two spectral bands, the normalization taking into account at least one of:

i) gain differences in a receiver signal chain caused by amplifier and/or antenna gain variations, and ii) differences caused by frequency propagation effects or theoretical propagation characteristics upon the at least two spectral bands, but not taking into account differences caused by interference signals;

c) a processor for generating a threshold value based upon a function of a normalized mean power per unit bandwidth in each spectral band; and d) a processor for choosing other spectral bands whose normalized mean power per unit bandwidth values are below the threshold value, and for providing the chosen spectral bands to a subsequent processing stage.

11. The signal processor as claimed in claim 10, wherein the signal processor is arranged to select at least two of the bands to be processed from a signal generated by a modulation process that inherently produces at least two bands having the same information content.

12. The signal processor as claimed in claim 10, wherein the signal processor additionally comprises a filter adapted to filter known interference signals before the power is measured at step a).

13. The signal processor as claimed in claim 10, wherein the processor for generating the threshold is arranged to set said threshold at a level greater than the mean power per unit bandwidth of the spectral band having the lowest mean power per unit bandwidth.

14. A radio receiver incorporating the signal processor according to claim 10.

* * * * *